United States Patent [19]

Fischer

[11] 3,849,107

[45] Nov. 19, 1974

[54] HERBICIDE

[75] Inventor: Adolf Fischer, Mutterstadt, Germany

[73] Assignee: Badische Anilin- & Soda-Fabrik Aktiengesellschaft, Ludwigshafen/Rhine, Germany

[22] Filed: July 13, 1971

[21] Appl. No.: 162,317

[30] Foreign Application Priority Data

July 28, 1970 Germany.............................. 2037265

[52] U.S. Cl.............................. 71/92, 71/87, 71/93, 71/111, 71/120, 71/121
[51] Int. Cl............................................... A01n 9/22
[58] Field of Search................................ 71/92, 121

[56] References Cited

UNITED STATES PATENTS

| | | | |
|---|---|---|---|
| 3,257,190 | 6/1966 | Soper | 71/121 |
| 3,442,639 | 5/1969 | Soper | 71/121 |
| 3,449,111 | 6/1969 | Wright | 71/121 |
| 3,697,522 | 10/1972 | Reicheneder et al. | 71/92 X |

Primary Examiner—James O. Thomas, Jr.
Attorney, Agent, or Firm—Johnston, Keil, Thompson & Shurtleff

[57] ABSTRACT

New and valuable herbicides based on mixtures of various herbicidal active ingredients.

1 Claim, No Drawings

HERBICIDE

The present invention relates to herbicides, particularly selective herbicides, which are suitable for controlling the growth of unwanted plants in crop plants.

It is known to use substituted dinitroaniline derivatives, phosphoric acids, pyridazones, substituted ureas, triazines and biscarbamates as herbicidal active ingredients. However, their action is not always satisfactory.

I have now found that herbicides comprising a mixture of a. a compound of the formula

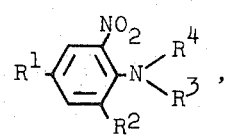

wherein $R^1$ denotes hydrogen, nitro, alkyl, trifluoromethyl or methylsulfonyl, $R^2$ denotes nitro, alkyl, trifluoromethyl or methylsulfonyl, $R^3$ and $R^4$ are identical or different and denote hydrogen, a linear or branched, saturated or unsaturated aliphatic radical which may be substituted by halogen, cyano, alkoxy or azido, or haloacetyloxyalkyl or alkylcarbamoyloxyalkyl, and $R^3$ and $R^4$, together with the nitrogen atom whose substituents they are, may also form a hexamethylenimine ring, or b. a compound of the formula

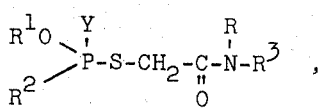

where $R^3$ denotes cycloalkyl or the radical

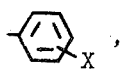

X denoting hydrogen or one or more identical or different radicals selected from the group consisting of halogen, $NO_2$, alkyl, alkenyl, alkynyl, haloalkyl, and alkoxy, R denotes a linear or branched, saturated or unsaturated aliphatic radical which may be substituted by halogen, cyano or alkoxy, Y denotes oxygen or sulfur, $R^1$ and $R^2$ each denote substituted or unsubstituted alkyl, alkenyl, alkynyl, aryl, aralkyl or cycloalkyl, and $R^2$ may also denote substituted or unsubstituted alkoxy, alkenoxy, alkynoxy, aroxy, aralkyloxy or cycloalkyloxy, with c. a compound of the formula

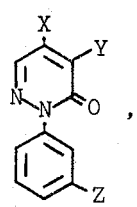

where X denotes alkoxy, thioalkyl, amino, alkylamino, dialkylamino, alkenylamino, dialkenylamino, alkynylamino, dialkynylamino, haloalkylamino, acetylamino, haloacetylamino, dimethylformamidine, methylformamidine, acetoacetyl, the group —NH—CO—COOR, —NH—CO—COSR, —NH—COOR, —NH—COSR,

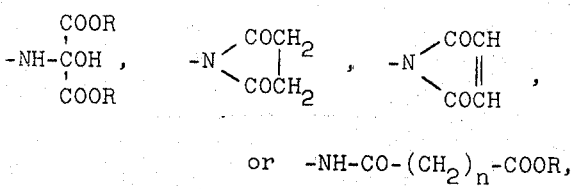

or $-NH-CO-(CH_2)_n-COOR$,

R denoting substituted or unsubstituted alkyl, alkenyl, alkynyl, aralkyl, aryl, or cycloalkyl, or hydrogen, and the alkali metal, alkaline earth metal and substituted amine salts of these compounds, and n denoting one of the integers from 1 to 6, Y denotes chlorine, bromine, alkoxy or thioalkyl, and Z denotes haloalkyl, alkyl or hydrogen, or with d. a compound of the formula

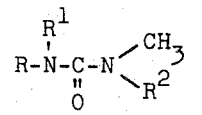

where R denotes phenyl which may be substituted by halogen, nitro, alkyl, alkoxy, alkenoxy, alkynoxy, haloalkyl, alkyl or dialkylcarbamoyloxy, a cycloaliphatic, bicycloaliphatic or tricycloaliphatic radical which may be substituted by halogen or alkyl, 3-benzothiazolyl, substituted or unsubstituted phenoxyalkyl, alkenyl or alkynylcarbamoyloxy, $R^1$ denotes hydrogen, cyclooctenyl or cyclohexenyl, $R^2$ denotes hydrogen, alkyl, alkoxy, alkoxyalkyl, isobuten-(1)-yl-3, $\alpha,\alpha$-dimethylpropargyl, cyanoalkyl, or carboxyalkyloxy, $R^2$ further denotes an $$\text{alkyl} - \underset{\underset{O}{\|}}{C} - O - CH_2$$

radical or its salts or esters, or with e. a compound of the formula

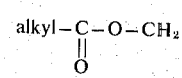

where R denotes alkyl or cyanoalkyl, $R^1$ denotes alkylamino, thioalkyl or azido, and X denotes halogen, alkoxy, thioalkyl or azido, or with f. a compound of the formula

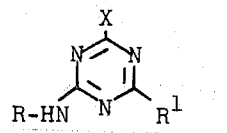

where R denotes phenyl which may be substituted by halogen, alkyl or haloalkyl, a linear or branched, saturated or unsaturated aliphatic radical which may be substituted by halogen, R further denotes alkoxyalkyl, alkyl or thioalkyl, Y denotes hydrogen or alkyl, $R^1$ denotes alkyl or acetylalkyl, Z denotes oxygen or sulfur, and n denotes 1 or 0, have a good herbicidal action, both pre- and postemergence, on weeds such as Chenopodium album, Galinsoga parviflora, Sinapis arvensis, Polygonum spp., Amaranthus spp., and Portulaca oleracea; on grassy weeds such as Poa spp., Bromus spp., Avena sativa and Cyperus spp.; and on millet types such as Panicum spp., Setaria spp., Digitaria spp., and Echinochloa spp. in the following crops: Gossypium spp., Soja hispida, Brassica napus, Beta spp., and Oryza sativa.

The individual active ingredients may be mixed together in any desired ratio; however, mixtures in which the ratio by weight of $a$ or $b$ to $c$, $d$, $e$ or $f$ is from 3:1 to 1:3 are preferred.

The phosphoric esters may be prepared by reacting salts of 0,0-diesters of thiophosphoric or dithiophosphoric acids with N-isobutynylchloroacetanilide. Preferred salts are alkali metal salts (Na,K) or $R^3NH$ salts, R denoting hydrogen, methyl, ethyl, isopropyl or n-propyl. These salts may also be prepared during the reaction with the chloroacetamide from the acid concerned and the appropriate alkalis or amines. The reaction proceeds sufficiently quickly both in inert organic solvents such as ketones, ethers, aliphatic or aromatic hydrocarbons and in water or mixtures of water with one or more of the abovementioned organic solvents. The reaction temperature may be from room temperature to the boiling point of the solvent employed; however, the preferable range is from 40° to 120°C.

EXAMPLE 1

Preparation of 0,0-diethyl-S-(N-isobutynyl-N-phenylcarbamoylmethyl)-dithiophosphoric acid 10.8 Parts by weight of the ammonium salt of 0,0-diethyldithiophosphoric acid and 11.1 parts of N-isobutynylchloroacetanilide are dissolved in a mixture of 50 parts of acetone and 10 parts of water. The mixture is heated for 4 hours at 60°C and diluted, after cooling, with water, and the product is dissolved in toluene or methylene chloride. The organic phase is washed once with a 5% by weight aqueous sodium carbonate solution and several times with water. After drying over sodium sulfate, the solution is concentrated in vacuo, finally under an oil pump vacuum, at less than 70°C. There is obtained 16.3 parts of the above compound as a pale yellow oil. $n_D^{25}$: 1.5540.

|  | N | S | P |
|---|---|---|---|
| calc.: | 3.77 | 17.25 | 8.36 |
| found: | 3.6 | 17.0 | 8.3 |

EXAMPLE 2

Preparation of 0,0-diethyl-S-(N-isobutynyl-N-phenylcarbamoylmethyl)-thiophosphoric acid Adopting the procedure of Example 1, 15.1 parts of the above compound ($n_D^{25}$: 1.5273) was obtained from 9.9 parts of the ammonium salt of 0,0-diethylthiophosphoric acid and 11.1 parts of N-isobutynylchloroacetanilide.

|  | N | S | P |
|---|---|---|---|
| calc.: | 3.95 | 9.0 | 8.73 |
| found: | 3.8 | 8.8 | 8.7 |

The agents according to the invention may be used as solvents, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150°C, e.g. tetrahydronaphthalene or alkylated naphthalenes, or organic liquids having boiling points higher than 150°C and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

To improve the action, wetting agents and adhering agents or oils may also be added.

EXAMPLE 3

An agricultural plot was sown with Gossypium hirsutum, Setaria viridis, Echinochloa crus-galli, Bromus tectorum, Amaranthus retroflexus and Portulaca oleracea and subsequently treated with the following amounts of the following individual active ingredients and mixtures of them, each active ingredient and each mixture being emulsified or dispersed in 500 liters of water per hectare:

I   N-allyl-N-β-chloroethyl-2,6-dinitro-4-trifluoromethylaniline, 1.5 and 4 kg per hectare;

II   N-propyl-N-β-chloroethyl-2,6-dinitro-4-trifluoromethylaniline, 1 and 4 kg per hectare;

III   N-propyl-N-β-cyanoethyl-2,6-dinitro-4-trifluoromethylaniline, 2 and 4 kg per hectare;

IV   N-ethyl-N-β-chloroethyl-2,6-dinitro-4-trifluoromethylaniline, 2 and 3 kg per hectare;

V   N,N-dipropyl-2,6-dinitro-4-methylsulfonylaniline, 1.5 and 3 kg per hectare;

VI   N-m-trifluoromethylphenyl-N-1-cyclohex-1-enyl-N',N'-dimethylurea, 2.5 and 4 kg per hectare;

VII   N-m-chlorophenyl-N-1-cyclohex-1-enyl-N',N'-dimethylurea, 3 and 4 kg per hectare;

VIII   N-p-fluorophenyl-N-1-cyclohex-1-enyl-N-methylurea, 2 and 4 kg per hectare;

IX   N-m-trifluoromethylphenyl-N',N'-dimethylurea, 1.5 and 3 kg per hectare;

X   N-p-chlorophenyl-N',N'-dimethylurea, 1 and 3 kg per hectare;

I + VI : 1.5 + 2.5 kg per hectare;

II + VII : 1 + 3 kg per hectare;
III + VIII: 2 + 2 kg per hectare;
IV + X : 2 + 1 kg per hectare;
V + IX : 1.5 + 1.5 kg per hectare.

After 4 to 5 weeks it was ascertained that the mixtures had a stronger herbicidal action than the individual active ingredients, combined with more favorable crop plant compatibility.

The results of the experiment are given in the following table:

TABLE

| | I | | II | | III | | IV | | V | | VI | | VII | | VIII | | IX | | X | |
|---|---|---|---|---|---|---|---|---|---|---|---|---|---|---|---|---|---|---|---|---|
| Kg./ha | 1.5 | 4 | 1 | 4 | 2 | 4 | 2 | 3 | 1.5 | 3 | 2.5 | 4 | 3 | 4 | 2 | 4 | 1.5 | 3 | 1 | 3 |
| Gossypium hirsutum | 0 | 15 | 0 | 30 | 0 | 20 | 0 | 20 | 0 | 15 | 0 | 35 | 0 | 10 | 0 | 30 | 0 | 20 | 0 | 30 |
| Setaria viridis | 90 | 100 | 55 | 100 | 60 | 95 | 80 | 100 | 80 | 100 | 80 | 100 | 70 | 90 | 70 | 100 | 60 | 95 | 70 | 100 |
| Echinochloa crus-galli | 80 | 100 | 55 | 100 | 60 | 95 | 80 | 100 | 80 | 100 | 95 | 100 | 70 | 90 | 80 | 100 | 60 | 95 | 70 | 100 |
| Bromus tectorum | 80 | 100 | 50 | 100 | 70 | 80 | 60 | 75 | 70 | 95 | 70 | 100 | 70 | 95 | 70 | 100 | 75 | 90 | 60 | 100 |
| Amaranthus retroflexus | 80 | 60 | 25 | 80 | 20 | 50 | 25 | 40 | 20 | 45 | 90 | 100 | 80 | 100 | 80 | 100 | 70 | 100 | 80 | 100 |
| Portulaca oleracea | 30 | 80 | 25 | 75 | 35 | 55 | 30 | 50 | 30 | 60 | 100 | 100 | 80 | 100 | 80 | 100 | 80 | 100 | 80 | 100 |

| | I+VI | II+VII | III+VIII | IV+X | V+IX |
|---|---|---|---|---|---|
| Kg./ha | 1.5+2.5 | 1+3 | 2+2 | 2+1 | 1.5+1.5 |
| Gossypium hirsutum | 0 | 0 | 0 | 0 | 0 |
| Setaria viridis | 100 | 100 | 100 | 100 | 100 |
| Echinochloa crus-galli | 100 | 100 | 100 | 100 | 100 |
| Bromus tectorum | 100 | 100 | 100 | 100 | 100 |
| Amaranthus retroflexus | 100 | 100 | 100 | 100 | 100 |
| Portulaca oleracea | 100 | 100 | 100 | 100 | 100 |

NOTE.—0=no damage; 100=complete destruction.

The action of the following mixtures corresponds to that of the mixtures in Example 3:

N,N-dipropyl-2,6-dinitro-4-trifluoromethylaniline;
N-β-methoxyethyl-N-β-chloroethyl-2,6-dinitro-4-trifluoromethylaniline;
N-β-methoxyethyl-N-β-azidoethyl-2,6-dinitro-4-trifluoromethylaniline;
N-ethyl-N-butyl-2,6-dinitro-4-trifluoromethylaniline;
N-isobutyl-N-β-cyanoethyl-2,6-dinitro-4-trifluoromethylaniline;
N-ethyl-N-β-cyanoethyl-2,6-dinitro-4-trifluoromethylaniline;
N-methyl-N-β-cyanoethyl-2,6-dinitro-4-trifluoromethylaniline;
N-butyl-N-β-cyanoethyl-2,6-dinitro-4-trifluoromethylaniline;
N-β-methoxyethyl-N-β-cyanoethyl-2,6-dinitro-4-trifluoromethylaniline;
N-methyl-N-β-cyanoethyl-2,6-dinitro-4-trifluoromethylaniline;
N-butyl-N-β-chloropropyl-2,6-dinitro-4-trifluoromethylaniline;
N-butyl-N-β-chloropropyl-2,6-dinitro-4-trifluoromethylaniline;
N-propyl-N-β-chloropropyl-2,6-dinitro-4-trifluoromethylaniline;
N-propyl-N-β-bromoethyl-2,6-dinitro-4-trifluoromethylaniline;
N,N-bis-β-(chloroethyl)-2,6-dinitro-4-trifluoromethylaniline;
N,N-bis-β-(chloroethyl)-2,6-dinitro-4-methylaniline;
N-propyl-N-allyl-4,6-dinitro-2-trifluoromethylaniline;
N-ethyl-N-β-azidoethyl-2,6-dinitro-4-trifluoromethylaniline;
N-propyl-N-β-azidoethyl-2,6-dinitro-4-trifluoromethylaniline;
N-propyl-N-β-(chloroacetyloxy)-ethyl-2,6-dinitro-4-trifluoromethylaniline;
N,N-bis-(β-chloroacetyloxy)-ethyl-2,6-dinitro-4-trifluoromethylaniline;
N-(β-chloroacetyloxy)-ethyl-2,6-dinitro-4-trifluoromethylaniline;
N-(β-methylcarbamoyloxy)-ethyl-2,6-dinitro-4-trifluoromethylaniline;
N-ethyl-N-β-bromoethyl-2,6-dinitro-4-trifluoromethylaniline;
N-β-methoxyethyl-N-β-bromoethyl-2,6-dinitro-4-trifluoromethylaniline;
N-γ-chloropropyl-N-β-chloroethyl-2,6-dinitro-4-trifluoromethylaniline;
N-propen-(1)-yl-(3)-N-β-chloroethyl-2,6-dinitro-4-methylaniline;
N-propyl-N-β-chloroethyl-2,6-dinitro-4-methylaniline;
N-propyl-N-β-azidoethyl-2,6-dinitro-4-methylaniline;
N-propyl-N-β-azidoethyl-2,6-dinitro-4-methylsulfonylaniline;
N-propyl-N-β-bromoethyl-2,6-dinitro-4-methylsulfonylaniline;
N-propyl-N-β-(chloroacetyloxy)-ethyl-2,6-dinitro-4-methylaniline;
N-propyl-N-β-(chloroacetyloxy)-propyl-2,6-dinitro-4-trifluoromethylaniline; or
N-propyl-N-β-(methylcarbamoyloxy)-propyl-2,6-dinitro-4-trifluoromethylaniline;

with

N-m-trifluoromethylphenyl-N-cyclohex-1-enyl-N'-methylurea;

N-3-chlorophenyl-N-cyclohex-1-enyl-N'-methylurea;
N-3-chloro-4-methoxyphenyl-N-cyclohex-1-enyl-N'-methylurea;
N-4-chlorophenyl-N-cyclohex-1-enyl-N'-methylurea;
N-phenyl-N-cyclohex-1-enyl-N'-methylurea;
N-phenyl-N-cyclohex-1-enyl-N'N'-dimethylurea;
1-(m-tert-butylcarbamoyloxyphenyl)-3-methylurea;
1-(m-ethylcarbamoyloxyphenyl)-3-methylurea;
1-(m-allyl-tert-butylcarbamoyloxyphenyl)-3,3-dimethylurea;
1-(m-α,α-dimethylpropyn-(1)-yl-(3)carbamoyloxyphenyl)-3-methyl-3-methoxyurea;
1-(m-α-methyl-α-ethylpropyn-(1)-yl-(3)carbamoyloxyphenyl)-3-methyl-3-methoxyurea;
1-(m-tert-butylallylcarbamoyloxyphenyl)-3-methyl-3-methoxyurea;
N-m-trifluoromethylphenyl-N'-butyn-(1)-yl-(3)-urea;
N-3-chloro-4-methoxyphenyl-N'-methyl-N'-methoxyurea;
N-m-trifluoromethylphenyl-N-methoxymethyl-N'-methylurea;
N-m-trifluoromethylphenyl-N-methoxymethyl-N'-methyl-N'-methoxyurea;
N-m-trifluoromethylphenyl-N-acetyloxymethyl-N',N'-dimethylurea;
N-4-bromophenyl-N-cyclohex-1-enyl-N'N'-dimethylurea;
N-3,4-dichlorophenyl-N-cyclohex-1-enyl-N'N'-dimethylurea;

EXAMPLE 4

In a greenhouse, loamy sandy soil was filled into pots and sown with Gossypium hirsutum, Digitaria sanguinalis, Echinochloa crus-galli, Amaranthus retroflexus and Portulaca oleracea. The soil prepared in this manner was subsequently treated with the following amounts of the following individual active ingredients and mixtures of them, each active ingredient and each mixture being dispersed of emulsified in 500 liters of water per hectare;

I    N-alkyl-N-β-chloroethyl-2,6-dinitro-4-trifluoromethylaniline, 2 and 4 kg per hectare;
II    N-propyl-N-β-chloroethyl-2,6-dinitro-4-trifluoromethylaniline, 1 and 3 kg per hectare;
III    N',N-dipropyl-2,6-dinitro-4-trifluoromethylaniline, 1.5 and 3 kg per hectare;
IV    2-chloro-4-ethylamino-6-butyn-1-yl-3-amino-1,3,5-triazine, 2 and 3 kg per hectare;
V 2-chloro-4-ethylamino-6-methoxyisopropylamino-1,3,5-triazine, 1.5 and 3 kg per hectare;
VI 2-thiomethyl-4,6-diisopropylamino-1,3,5-triazine, 2 and 4 kg per hectare;
I + VI : 2 + 2 kg per hectare;
II + IV : 1 + 2 kg per hectare;
III + V : 1.5 + 1.5 kg per hectare.

After 4 to 5 weeks it was ascertained that the mixtures had a stronger herbicidal action than the individual active ingredients, combined with more favorable crop plant compatibility.

The results of the experiment are given in the following table.

Table

| kg/ha | I 2 | I 4 | I 1 | 3 | III 1.5 | 3 | IV 2 | 3 | V 1.5 | 3 | VI 2 | 4 | I+VI 2+2 | II+IV 1+2 | III+V 1.5+1.5 |
|---|---|---|---|---|---|---|---|---|---|---|---|---|---|---|---|
| Gossypium hirsutum | 0 | 15 | 0 | 20 | 0 | 20 | 5 | 15 | 5 | 25 | 0 | 20 | 0 | 0 | 0 |
| Digitaria sanguinalis | 80 | 100 | 85 | 100 | 80 | 100 | 65 | 85 | 75 | 80 | 45 | 85 | 100 | 100 | 100 |
| Echinochloa crus-galli | 85 | 100 | 85 | 100 | 85 | 100 | 60 | 90 | 45 | 80 | 50 | 90 | 100 | 100 | 100 |
| Amaranthus retroflexus | 25 | 80 | 25 | 70 | 20 | 60 | 65 | 90 | 70 | 100 | 70 | 100 | 100 | 100 | 100 |
| Portulaca oleracea | 30 | 80 | 25 | 70 | 25 | 55 | 60 | 100 | 70 | 100 | 60 | 100 | 100 | 100 | 100 |

0 = no damage
100 = complete destruction

N-3-chloro-4-methoxyphenyl-N-cyclohex-1-enyl-N'N'-dimethylurea;
N-[1- or 2-(3a, 4, 5, 6,7,7a-hexahydro)-4-methanoindanyl]-N'N'-dimethyl-N-cyclohex-1-enylurea;
N-m-trifluoromethylphenyl-N-cyclooct-1-enyl-N'N'-dimethylurea;
N-m-trifluoromethylphenyl-N-cyclooctyl-1-enyl-N'-methylurea;
N- 5-(3a,4,5,6,7,7a-hexahydro-4-methanoindanyl -N'N'-dimethylurea;
N- 1- or 2-(3a,4,5,6,7,7a-hexahydro)-4-methanoindanyl -N'N'-dimethylurea;
N-bicyclo-(3,3,0)-octyl-N'N'-dimethylurea;
N-3,4-dichlorophenyl-N'N'-dimethylurea;
N-cyclooctyl-N'N'-dimethylurea; or
N-m-dimethylcarbamoyloxyphenyl-N'-methylurea.

The action of the following mixtures corresponds to that of those above:

N,N-dipropyl-2,6-dinitro-4-methylsulfonylaniline;
N-ethyl-N-butyl-2,6-dinitro-4-methylsulfonylaniline;
N-β-methoxyethyl-N-β-chloroethyl-2,6-dinitro-4-trifluoromethylaniline;
N-β-methoxyethyl-N-β-azidoethyl-2,6-dinitro-4-trifluoromethylaniline;
N-propyl-N-β-cyanoethyl-2,6-dinitro-4-trifluoromethylaniline;
N-ethyl-N-β-chloroethyl-2,6-dinitro-4-trifluoromethylaniline;
N-ethyl-N-butyl-2,6-dinitro-4-trifluoromethylaniline;
N-isobutyl-N-β-cyanoethyl-2,6-dinitro-4-trifluoromethylaniline;
N-ethyl-N-β-cyanoethyl-2,6-dinitro-4-trifluoromethylaniline;

N-methyl-N-β-cyanoethyl-2,6-dinitro-4-trifluoromethylaniline;

N-β-methoxyethyl-N-β-cyanoethyl-2,6-dinitro-4-trifluoromethylaniline;

N-butyl-N-β-cyanoethyl-2,6-dinitro-4-trifluoromethylaniline;

N-methyl-N-β-cyanoethyl-2,6-dinitro-4-trifluoromethylaniline;

N-butyl-N-β-chloropropyl-2,6-dinitro-4-trifluoromethylaniline;

N-butyl-N-γ-chloropropyl-2,6-dinitro-4-trifluoromethylaniline;

N-propyl-N-β-chloropropyl-2,6-dinitro-4-trifluoromethylaniline;

N-propyl-N-β-bromoethyl-2,6-dinitro-4-trifluoromethylaniline;

N,N-bis-β-(chloroethyl)-2,6-dinitro-4-trifluoromethylaniline;

N,N-bis-β-(chloroethyl)-2,6-dinitro-4-methylaniline;

N-propyl-N-allyl-4,6-dinitro-2-trifluoromethylaniline;

N-ethyl-N-β-azidoethyl-2,6-dinitro-4-trifluoromethylaniline;

N-propyl-N-β-azidoethyl-2,6-dinitro-4-trifluoromethylaniline;

N-propyl-N-β-(chloroacetyloxy)-ethyl-2,6-dinitro-4-trifluoromethylaniline;

N,N-bis-(β-chloroacetyloxy)-ethyl-2,6-dinitro-4-trifluoromethylaniline;

N-(β-chloroacetyloxy)-ethyl-2,6-dinitro-4-trifluoromethylaniline;

N-(β-methylcarbamoyloxy)-ethyl-2,6-dinitro-4-trifluromethylaniline; N-methyl-N-β-bromoethyl-2,6-dinitro-4-trifluromethylaniline;

N-β-methoxyethyl-N-β-bromoethyl-2,6-dinitro-4-trifluoromethylaniline;

N-γ-chloropropyl-N-β-chloroethyl-2,6-dinitro-4-trifluoromethylaniline;

N-propen-(1)-yl-(3)-N-β-chloroethyl-2,6-dinitro-4-methylaniline;

N-propyl-N-β-chloroethyl-2,6-dinitro-4-methylaniline;

N-propyl-N-β-azidoethyl-2,6-dinitro-4-methylaniline;

N-propyl-N-β-azidoethyl-2,6-dinitro-4-methylsulfonylaniline;

N-propyl-N-β-bromoethyl-2,6-dinitro-4-methylsulfonylaniline;

N-propyl-N-β-(chloroacetyloxy)-ethyl-2,6-dinitro-4-methylaniline;

N-propyl-N-β-(chloroacetyloxy)-propyl-2,6-dinitro-4-trifluoromethylaniline; or

N-propyl-N-β-(methylcarbamoyloxy)-propyl-2,6-dinitro-4-trifluoromethylaniline with 2-chloro-4-ethylamino-6-butyn-1-yl-3-amino-1,3,5-triazine;

2-chloro-4-ethylamino-6-methoxyisopropylamino-1,3,5-triazine;

2-chloro-4-ethylamino-6-α,α-dimethylpropargylamino-1,3,5-triazine;

2-chloro-4-isopropylamino-6-α,α-dimethylpropargylamino-1,3,5-triazine;

2-thiomethyl-4-ethylamino-6-butyn-1-yl-3-amino-1,3,5-triazine;

2-chloro-4-ethylamino-6-sec-butylamino-1,3,5-triazine;

2-chloro-4-ethylamino-6-α,α-dimethylcyanomethylamino-1,3,5-triazine;

2-chloro-4-isopropylamino-6-diethylamino-1,3,5-triazine;

2-methoxy-4-isopropylamino-6-ethylamino-1,3,5-triazine;

2-thiomethyl-4-isopropylamino-6-tert-butylamino-1,3,5-triazine; or 2-azido-4-sec-butylamino-6-thiomethyl-1,3,5-triazine.

EXAMPLE 5

An agricultural area was sown with Soja hispida, Digitaria sanguinalis, Bromus tectorum, Amaranthus retroflexus and Portulaca oleracea and subsequently treated with the following amounts of the following individual active ingredients and mixtures of them, each active ingredient and each mixture being dispersed or emulsified in 500 liters of water per hectare:

I  N-allyl-N-β-chloroethyl-2,6-dinitro-4-trifluoromethylaniline, 1 and 3 kg per hectare;

II  N-propyl-N-β-chloroethyl-2,6-dinitro-4-trifluoromethylaniline, 1 and 2 kg per hectare;

III  N', N-dipropyl-2,6-dinitro-4-trifluoromethylaniline, 1 and 3 kg per hectare;

IV  1-m-trifluoromethylphenyl-4-dimethylamino-5-chloropyridazone-6, 2 and 3 kg per hectare;

V  1-phenyl-4,5-dimethoxypyridazone-6, 1 and 2 kg per hectare;

VI  1-m-methylphenyl-4-methoxy-5-bromopyridazone-6, 2 and 3 kg per hectare;

VII  N-m-trifluoromethylphenyl-N-cyclohex-1-enyl-N',N'-dimethylurea, 2 and 3 kg per hectare;

VIII  N,N-dimethyl-N'-[N''-methoxyisopropylcarbamoyloxyphenyl]-urea, 1 and 2 kg per hectare;

IX  N-4-(p-chlorophenoxy)-phenyl-N',N-dimethylurea, 2 and 3 kg per hectare;

X  2-chloro-4-ethylamino-6-(α,α-dimethylcyanomethyl)-amino-1,3,5-triazine, 1 and 2 kg per hectare;

I + IV : 1 + 2 kg per hectare;
II + V : 1 + 1 kg per hectare;
III + 3 VI: 1 + 2 kg per hectare;
I + VII : 1 + 2 kg per hectare;
II + VIII : 1 + 1 kg per hectare;
III + IX : 1 + 2 kg per hectare;
I + X : 1 + 1 kg per hectare.

After 4 to 5 weeks it was ascertained that the mixtures had a stronger herbicidal action than the individual active ingredients, combined with more favorable crop plant compatibility.

The results of the experiment are given in the following table:

TABLE

| Kg./ha. | I | | II | | III | | IV | | V | | VI | | VII | | VIII | | IX | | X | |
|---|---|---|---|---|---|---|---|---|---|---|---|---|---|---|---|---|---|---|---|---|
| | 1 | 3 | 1 | 2 | 1 | 3 | 2 | 3 | 1 | 2 | 2 | 3 | 2 | 3 | 1 | 2 | 2 | 3 | 1 | 2 |
| Soja hispida | 0 | 15 | 0 | 10 | 0 | 20 | 0 | 15 | 0 | 20 | 0 | 10 | 0 | 20 | 0 | 20 | 5 | 25 | 0 | 20 |
| Digitaria sanguinalis | 70 | 100 | 85 | 100 | 65 | 100 | 65 | 95 | 55 | 90 | 50 | 75 | 80 | 100 | 45 | 85 | 60 | 90 | 30 | 75 |
| Bromus tectorum | 70 | 100 | 75 | 100 | 70 | 100 | 55 | 80 | 55 | 95 | 40 | 65 | 50 | 75 | 50 | 95 | 55 | 80 | 50 | 95 |
| Amaranthus retroflexus | 15 | 50 | 25 | 50 | 15 | 50 | 60 | 85 | 70 | 100 | 70 | 95 | 90 | 100 | 50 | 95 | 45 | 90 | 45 | 85 |
| Portulaca oleracea | 15 | 50 | 25 | 55 | 20 | 55 | 60 | 85 | 70 | 95 | 65 | 90 | 95 | 100 | 65 | 100 | 60 | 95 | 70 | 100 |

Table — Continued

| | I+IV | II+V | III+VI | I+VII | II+VIII | III+IX | II+X |
|---|---|---|---|---|---|---|---|
| Kg./ha | 1+2 | 1+1 | 1+2 | 1+2 | 1+1 | 1+2 | 1+1 |
| Soja hispida | 0 | 0 | 0 | 0 | 0 | 0 | 0 |
| Digitaria sanguinalis | 100 | 100 | 100 | 100 | 100 | 100 | 100 |
| Bromus tectorum | 100 | 100 | 100 | 100 | 100 | 100 | 100 |
| Amaranthus retroflexus | 85 | 100 | 95 | 100 | 90 | 80 | 85 |
| Portulaca oleracea | 90 | 100 | 100 | 100 | 100 | 95 | 100 |

NOTE.—0=no damage; 100=complete destruction.

The action of the following mixtures corresponds to that of those above:

N-β-methoxyethyl-N-β-chloroethyl-2,6-dinitro-4-trifluoromethylaniline;
N-β-methoxyethyl-N-β-azidoethyl-2,6-dinitro-4-trifluoromethylaniline;
N-propyl-N-β-cyanoethyl-2,6-dinitro-4-trifluoromethylaniline;
N-ethyl-N-β-chloroethyl-2,6-dinitro-4-trifluoromethylaniline;
N-ethyl-N-butyl-2,6-dinitro-4-trifluoromethylaniline;
N-isobutyl-N-β-cyanoethyl-2,6-dinitro-4-trifluoromethylaniline;
N-ethyl-N-β-cyanoethyl-2,6-dinitro-4-trifluoromethylaniline;
N-methyl-N-β-cyanoethyl-2,6-dinitro-4-trifluoromethylaniline;
N-β-methoxyethyl-N-β-cyanoethyl-2,6-dinitro-4-trifluoromethylaniline;
N-butyl-N-β-cyanoethyl-2,6-dinitro-4-trifluoromethylaniline;
N-methyl-N-β-cyanoethyl-2,6-dinitro-4-trifluoromethylaniline;
N-butyl-N-β-chloropropyl-2,6-dinitro-4-trifluoromethylaniline;
N-isobutyl-N-γ-chloropropyl-2,6-dinitro-4-trifluoromethylaniline;
N-propyl-N-β-chloropropyl-2,6-dinitro-4-trifluoromethylaniline;
N-propyl-N-β-bromoethyl-2,6-dinitro-4-trifluoromethylaniline;
N,N-bis-β-(chloroethyl)-2,6-dinitro-4-trifluoromethylaniline;
N,N-bis-β-(chloroethyl)-2,6-dinitro-4-methylaniline;
N-propyl-N-allyl-4,6-dinitro-2-trifluoromethylaniline;
N-ethyl-N-β-azidoethyl-2,6-dinitro-4-trifluoromethylaniline;
N-propyl-N-β-azidoethyl-2,6-dinitro-4-trifluoromethylaniline;
N-propyl-N-β-(chloroacetyloxy)-ethyl-2,6-dinitro-4-trifluoromethylaniline;
N,N-bis-(β-chloroacetyloxy)-ethyl-2,6-dinitro-4-trifluoromethylaniline;
N-(β-chloroacetyloxy)-ethyl-2,6-dinitro-4-trifluoromethylaniline;
N-(β-methylcarbamoyloxy)-ethyl-2,6-dinitro-4-trifluoromethylaniline;
N-ethyl-N-β-bromoethyl-2,6-dinitro-4-trifluoromethylaniline;
N-β-methoxyethyl-N-β-bromoethyl-2,6-dinitro-4-trifluoromethylaniline;
N-γ-chloropropyl-N-β-chloroethyl-2,6-dinitro-4-trifluoromethylaniline;
N-propen-(1)-yl-(3)-N-β-chloroethyl-2,6-dinitro-4-methylaniline;
N-propyl-N-β-chloroethyl-2,6-dinitro-4-methylaniline;
N-propyl-N-β-azidoethyl-2,6-dinitro-4-methylaniline;
N-propyl-N-β-azidoethyl-2,6-dinitro-4-methylsulfonylaniline;
N-propyl-N-β-bromoethyl-2,6-dinitro-4-methylsulfonylaniline;
N-propyl-N-β-(chloroacetyloxy)-ethyl-2,6-dinitro-4-methylaniline;
N-propyl-N-β-(chloroacetyloxy)-propyl-2,6-dinitro-4-trifluoromethylaniline; or
N-propyl-N-β-(methylcarbamoyloxy)-propyl-2,6-dinitro-4-trifluoromethylaniline with
1-m-trifluoromethylphenyl-4-methoxy-5-bromopyridazone-6;
1-m-trifluoromethylphenyl-4,5-dimethoxypyridazone-6;
1-m-trifluoromethylphenyl-4-diethylamino-5-chloropyridazone-6;
1-m-methylphenyl-4-amino-5-bromopyridazone-6;
1-m-methylphenyl-4-methoxy-5-bromopyridazone-6;
1-m-methylphenyl-4,5-dimethoxypyridazone-6;
1-m-trifluoromethylphenyl-4-dimethylamino-5-bromopyridazone-(6);
1-phenyl-4-dichloroacetylamino-5-bromopyridazone-(6);
1-phenyl-4-bromoacetylamino-5-bromopyridazone-(6);
N-[1-m-methylphenyl-5-chloropyridazon-(6)-yl-(4)]-oxamic acid, tert-butyl ester;
N-[1-phenyl-5-bromopyridazon-(6)-yl-(4)]-oxamic acid, propargyl ester;
N-[1-phenyl-5-bromopyridazon-(6)-yl-(4)]-oxamic acid, isopropyl ester;
N-[1-phenyl-5-bromopyridazon-(6)-yl-(4)]-azelamic acid, ethyl ester;
N-[1-phenyl-5-bromopyridazon-(6)-yl-(4)]-suberamic acid, ethyl ester;
N-[1-phenyl-5-bromopyridazon-(6)-yl-(4)]-adipamic acid;
N-[1-phenyl-5-bromopyridazon-(6)-yl-(4)]-adipamic acid, isobutyl ester;
N-[1-phenyl-5-bromopyridazon-(6)-yl-(4)]-adipamic acid, β-trifluoroethyl ester;
N-[1-phenyl-5-bromopyridazon-(6)-yl-(4)]-malonamic acid, ethyl ester;
N-[1-phenyl-5-bromopyridazon-(6)-yl-(4)]-malonamic acid, methyl ester;
N-[1-cyclohexyl-5-chloropyridazon-(6)-yl-(4)]-malonamic acid, methyl ester;
N-[1-cyclohexyl-5-chloropyridazon-(6)-yl-(4)]-glutaramic acid, methyl ester;
1-(m-tert-butylcarbamoyloxyphenyl)-3-methylurea;
1-(m-ethylcarbamoyloxyphenyl)-3-methylurea;

1-(m-allyl-tert-butylcarbamoyloxyphenyl)-3,3-dimethylurea;
1-(m-α,α-dimethylpropyn-(1)-yl-(3)carbamoyloxyphenyl)-3-methyl-3-methoxyurea;
1-(m-α-methyl-α-ethylpropyn(1)-yl-(3)carbamoyloxyphenyl)-3-methyl-3-methoxyurea;
1-(m-tert-butylallylcarbamoyloxyphenyl)-3-methyl-3-methoxyurea;
N-m-trifluoromethylphenyl-N'-methyl-N'-butyn-(1)yl(3)-urea;
N-3-chloro-4-methoxyphenyl-N'-methyl-N'-methoxyurea;
N-m-trifluoromethylphenyl-N-methoxymethyl-N'-methylurea;
N-m-trifluoromethylphenyl-N-methoxymethyl-N'-methyl-N'-methoxyurea;
N-m-trifluoromethylphenyl-N-acetyloxymethyl-N',N'-dimethylurea;
N-m-trifluoromethylphenyl-N-cyclohex-1-enyl-N'-methylurea;
N-3-chlorophenyl-N-cyclohex-1-enyl-N'-methylurea;
N-3-chloro-4-methoxyphenyl-N-cyclohex-1-enyl-N'-methylurea;
N-4-chlorophenyl-N-cyclohex-1-enyl-N'-methylurea;
N-phenyl-N-cyclohex-1-enyl-N'-methylurea;
N-phenyl-N-cyclohex-1-enyl-N'N'-dimethylurea;
N-4-bromophenyl-N-cyclohex-1-enyl-N'N'-dimethylurea;
N-3,4-dichlorophenyl-N-cyclohex-1-enyl-N'N'-dimethylurea;
N-3-chloro-4-methoxyphenyl-N-cyclohex-1-enyl-N'N'-dimethylurea;
N-[1- or 2- (3a,4,5,6,7,7a-hexahydro-4)-methanoindanyl]-N'N'-dimethyl-N-cyclohex-1-enylurea;
N-m-trifluoromethylphenyl-N-cyclooct-1-enyl-N'N'-dimethylurea;
N-m-trifluoromethylphenyl-N-cyclooctyl-1-enyl-N'-methylurea;
N-[5-(3a,4,5,6,7,7a-hexahydro-4)-methanoindanyl]-N'N'-dimethylurea;
N-[1- or 2-(3a,4,5,6,7,7a-hexahydro-4-)-methanoindanyl]-N'N'-dimethylurea;
N-bicyclo-(3,3,0)-octyl-N'N'-dimethylurea;
N-3,4-dichlorophenyl-N'N'-dimethylurea;
N-cyclooctyl-N'N'-dimethylurea;
N-m-dimethylcarbamoyloxyphenyl-N'-methylurea;
N-p-chlorophenyl-N-1-cyclohex-1-enyl-N'N'-dimethylurea;
N-p-fluorophenyl-N-1-cyclohex-1-enyl-N'-methylurea;
N-4-[4-methoxyphenoxyphenyl]-N'N'-dimethylurea;
N-3,4-dichlorophenyl-N'-methyl-N'-methoxyurea;
N-(3-chloro-4-bromophenyl)-N'-methyl-N'-methoxyurea;
2-azido-4-sec-butylamino-6-thiomethyl-1,3,5-triazine;
2-thiomethyl-4-isopropylamino-6-tert-butylamino-1,3,5-triazine;
2-thiomethyl-4-isopropylamino-6-sec-butylamino-1,3,5-triazine;
2-thiomethyl-4-ethylamino-6-sec-butylamino-1,3,5-triazine;
2-chloro-4-ethylamino-6-sec-butylamino-1,3,5-triazine; or
2-chloro-4-methylamino-6-(α,α-dimethylcyanomethyl)-amino-1,3,5-triazine.

EXAMPLE 6

An agricultural plot was sown with Gossypium hirsutum, Soja hispida, Digitaria sanguinalis, Bromus tectorum, Amaranthum retroflexus and Polygonum persicaria, and subsequently treated with the following amounts of the following individual active ingredients and mixtures of them, each active ingredient and each mixture being emulsified or dispersed in 500 liters of water per hectare:

I   0,0-diethyl-S-[N-phenyl-N-butyn-1-yl-(3)-carbamoylmethyl]-dithiophosphoric acid, 1, 2 and 3 kg per hectare;
II  0,0-diethyl-S-(N-butyn-1-yl-(3)-N-phenylcarbamoylmethyl)-thiophosphoric acid, 1, 2 and 3 kg per hectare;
III 1-(3'-trifluoromethyl)-phenyl-4-methoxy-5-chloropyridazone-6, 2 and 3 kg per hectare;
IV  1-phenyl-4,5-dimethoxypyridazone-6, 1 and 2 kg per hectare;
V   N-m-trifluoromethylphenyl-N-1-cyclohex-1-enyl-N'-dimethylurea, 2 and 3 kg per hectare;
VI  N-m-trifluoromethylphenyl-N',N'-dimethylurea, 2 and 3 kg per hectare;
VII 2-chloro-4-ethylamino-6-methoxyisopropyl-1,3,5-triazine, 1 and 3 kg per hectare;
I + III : 1 + 2 kg per hectare;
II + IV : 1 + 1 kg per hectare;
I + V : 1 + 2 kg per hectare;
II + VI : 1 + 2 kg per hectare;
I + VII : 2 + 1 kg per hectare.

After 4 to 5 weeks it was ascertained that the mixtures had a better herbicidal action than the individual active ingredients, combined with more favorable crop plant compatibility.

The results of the experiment are given in the following table:

Table

| kg/ha | I 1 | 2 | 3 | II 1 | 2 | 3 | III 2 | 3 | IV 1 | 2 | V 2 | 3 | VI 2 | 3 | VII 1 | 3 |
|---|---|---|---|---|---|---|---|---|---|---|---|---|---|---|---|---|
| Gossypium hirsutum | 0 | 0 | 20 | 0 | 10 | 25 | 0 | 15 | 0 | 15 | 0 | 20 | 0 | 10 | 0 | 25 |
| Soja hispida | 0 | 0 | 10 | 0 | 10 | 20 | 10 | 30 | 0 | 0 | 0 | 20 | 10 | 20 | 0 | 35 |
| Digitaria sanguinalis | 80 | 100 | 100 | 80 | 100 | 100 | 65 | 95 | 45 | 90 | 70 | 100 | 60 | 90 | 65 | 100 |
| Bromus tectorum | 80 | 100 | 100 | 80 | 100 | 100 | 50 | 75 | 45 | 95 | 65 | 100 | 50 | 80 | 70 | 100 |

Table—Continued

| kg/ha | I 1 | 2 | 3 | II 1 | 2 | 3 | III 2 | 3 | IV 1 | 2 | V 2 | 3 | VI 2 | 3 | VII 1 | 3 |
|---|---|---|---|---|---|---|---|---|---|---|---|---|---|---|---|---|
| Amaranthus retroflexus | 30 | 55 | 90 | 20 | 40 | 65 | 65 | 95 | 75 | 100 | 70 | 100 | 75 | 100 | 95 | 100 |
| Polygonum persicaria | 10 | 20 | 30 | 10 | 15 | 25 | 70 | 100 | 80 | 100 | 80 | 100 | 75 | 100 | 70 | 100 |

| kg/ha | I + III  1 + 2 | II + IV  1 + 1 | I + V  1 + 2 | II + VI  1 + 2 | I + VII  2 + 1 |
|---|---|---|---|---|---|
| Gossypium hirsutum | 0 | 0 | 0 | 0 | 0 |
| Soja hispida | 10 | 0 | 0 | 10 | 0 |
| Digitaria sanguinalis | 100 | 100 | 100 | 100 | 100 |
| Bromus tectorum | 100 | 100 | 100 | 100 | 100 |
| Amaranthus retroflexus | 100 | 100 | 100 | 100 | 100 |
| Polygonum persicaria | 90 | 95 | 100 | 95 | 100 |

0 = no damage
100 = complete destruction

EXAMPLE 7

In a greenhouse, the plants Gossypium hirsutum, Soja hispida, Zea mays, Echinochloa crus-galli, Bromus tectorum, Amaranthus retroflexus and Polygonum persicaria were treated at a growth height of 3 to 20 cm with the following amounts of the following individual active ingredients and mixtures of them, each active ingredient and each mixture being emulsified or dispersed in 500 liters of water per hectare:

I  0,0-dimethyl-S-(N-butyn-1-yl-(3)-N-phenylcarbamoylmethyl)-dithiophosphoric acid, 1 and 4 kg per hectare;

II  0,0-dimethyl-S-(N-butyn-1-yl-(3)-N-phenylcarbamoylmethyl)-thiophosphoric acid, 1.5 and 3 kg per hectare;

III  1-m-trifluoromethylphehyl-4-dimethylamino-5-chloropyridazone-6, 3 and 4 kg per hectare;

IV  N-m-trifluoromethylphenyl-N-1-cyclohex-1-enyl-N',N'-dimethylurea, 1.5 and 3 kg per hectare;

I + III : 1 + 1 kg per hectare;

II + IV : 1.5 + 1.5 kg per hectare.

The spray liquids were sprayed onto the undersides of the leaves. After 3 to 4 weeks, it was ascertained that the mixtures had a stronger herbicidal action than the individual active ingredients, combined with superior crop plant compatibility.

The results of the experiment are given in the following table:

EXAMPLE 8

In a greenhouse, loamy sandy soil was filled into pots and sown with Brassica napus, Beta vulgaris, Echinochloa crus-galli, Avena fatua, Sinapis arvensis and Galinsoga parviflora; subsequently, the soil prepared in this manner was treated with the following amounts of the following individual active ingredients and mixtures of them, each active ingredient and each mixture being dispersed or emulsified in 500 liters of water per hectare:

I  0,0-diethyl-S-[N-phenyl-N-butyn-1-yl-(3)-carbamoylmethyl]-dithiophosphoric acid, 1.5 and 3 kg per hectare;

II  0,0-diethyl-S-(N-isobutynyl-N-phenylcarbamoylmethyl)-thiophosphoric acid, 1 and 4 kg per hectare;

III  dimethylaminoethanol salt of N-[1-phenyl-5-bromopyridazon-6-yl-(4)]-oxamic acid, 1.5 and 3 kg per hectare;

IV  1-phenyl-4-amino-5-chloropyridazone-(6), 3 and 4 kg per hectare;

I + III : 1.5 + 1.5 kg per hectare;

II + IV : 1 + 3 kg per hectare.

After 4 to 5 weeks, it was ascertained that the mixtures had a stronger herbicidal action than the individual active ingredients, combined with superior crop plant compatibility.

Table

| kg/ha | I 1 | 4 | II 1.5 | 3 | III 3 | 4 | IV 1.5 | 3 | I+III 1 + 1 | II+IV 1.5 + 1.5 |
|---|---|---|---|---|---|---|---|---|---|---|
| Gossypium hirsutum | 0 | 25 | 0 | 20 | 0 | 10 | 0 | 20 | 0 | 0 |
| Soja hispida | 0 | 25 | 0 | 20 | 10 | 25 | 0 | 25 | 10 | 0 |
| Zea mays | 0 | 20 | 0 | 20 | 10 | 25 | 0 | 15 | 10 | 0 |
| Echinochloa crus-galli | 80 | 100 | 95 | 100 | 70 | 100 | 60 | 100 | 100 | 100 |
| Bromus tectorum | 80 | 100 | 80 | 100 | 70 | 100 | 65 | 100 | 100 | 100 |
| Amaranthus retroflexus | 40 | 100 | 40 | 80 | 70 | 95 | 60 | 100 | 100 | 100 |
| Polygonum persicaria | 20 | 80 | 25 | 85 | 80 | 100 | 70 | 100 | 100 | 100 |

0 = no damage
100 = complete destruction

The results of the experiment are given in the following table:

Table

| kg/ha | I 1.5 | 3 | II 1 | 4 | III 1.5 | 5 | IV 3 | 4 | I + III 1.5 + 1.5 | II + IV 1 + 3 |
|---|---|---|---|---|---|---|---|---|---|---|
| Brassica napus | 0 | 10 | 0 | 20 | 0 | 25 | 15 | 15 | 0 | 15 |
| Beta vulgaris | 0 | 20 | 0 | 30 | 0 | 15 | 0 | 10 | 0 | 0 |
| Echinochloa crus-galli | 80 | 100 | 95 | 100 | 75 | 100 | 65 | 75 | 100 | 100 |
| Avena fatua | 60 | 100 | 65 | 100 | 35 | 70 | 40 | 75 | 100 | 100 |
| Sinapis arvensis | 10 | 20 | 10 | 30 | 80 | 100 | 80 | 100 | 95 | 100 |
| Galinsoga parviflora | 10 | 20 | 10 | 20 | 65 | 100 | 70 | 85 | 80 | 80 |

0 = no damage
100 = complete destruction

EXAMPLE 9

In a greenhouse the plants Beta vulgaris, Oryza sativa, Echinochloa crus-galli, Avena fatua, Galinsoga parviflora and Chenopodium album were treated at a growth height of 2 to 12 cm with the following amounts of the following individual active ingredients and mixtures of them, each active ingredient and each mixture being dispersed or emulsified in 500 liters of water per hectare:

I  O,O-dimethyl-S-(N-butyn-1-yl-(3)-N-phenylcarbamoylmethyl)-dithiophosphoric acid, 0.5, 1 and 2 kg per hectare;

II  O,O-dimethyl-S-(N-butyn-1-yl-(3)-N-phenylcarbamoylmethyl)-thiophosphoric acid, 1, 1.5 and 3 kg per hectare;

III dimethylaminoethanol salt of N-[1-phenyl-5-bromopyridazon-6-yl-(4)]-oxamic acid, 1.5, 2 and 3 kg per hectare;

IV  3-methoxycarbonylaminophenyl-N-(3'-methylphenyl)-carbamate, 0.5, 1, 1.5 and 2 kg per hectare;

I + III : 0.5 + 1.5 kg per hectare;
I + IV : 1 + 1 kg per hectare;
II + III : 1 + 2 kg per hectare;
II + IV : 1 + 0.5 kg per hectare.

After 3 to 4 weeks it was ascertained that the mixtures had a stronger herbicidal action than the individual active ingredients, combined with superior crop plant compatibility.

The results of the experiment are given in the following table:

O,O-dimethyl-S-(N-butyn-1-yl-(3)-N-phenylcarbamoylmethyl)-dithiophosphoric acid;

methyl-O-methyl-S-(N-butyn-1-yl-(3)-N-phenylcarbamoylmethyl)-dithiophosphoric acid;

ethyl-O-ethyl-S-(N-butyn-1-yl-(3)-N-phenylcarbamoylmethyl)-dithiophosphoric acid;

O,O-diallyl-S-(N-butyn-1-yl-(3)-N-phenylcarbamoylmethyl)-dithiophosphoric acid;

ethyl-O-methyl-S-(N-butyn-1-yl-(3)-N-phenylcarbamoylmethyl)-dithiophosphoric acid;

phenyl-O-ethyl-S-(N-butyn-1-yl-(3)-N-phenylcarbamoylmethyl)-dithiophosphoric acid;

O,O-diphenyl-S-(N-butyn-1-yl-(3)-N-phenylcarbamoylmethyl)-dithiophosphoric acid;

O,O-diethyl-S-(3,5-dimethylmorpholine-N-carbamoylmethyl)-dithiophosphoric acid;

O,O-diethyl-S-(2,5-dimethylmorpholine-N-carbamoylmethyl)-dithiophosphoric acid;

O,O-diethyl-S-(N-ethyl-N-3'-methylphenylcarbamoylmethyl)-dithiophosphoric acid;

O,O-diethyl-S-(N-isopropyl-N-3'-phenylcarbamoylmethyl)-dithiophosphoric acid;

O,O-diethyl-S-(N-propargyl-N-phenylcarbamoylmethyl)-dithiophosphoric acid;

O,O-diethyl-S-(N-bromobutyn-1-yl-(3)-N-phenylcarbamoylmethyl)-dithiophosphoric acid;

O,O-diethyl-S-(N-cyanomethyl-N-phenylcarbamoylmethyl)-dithiophosphoric acid;

O,O-diethyl-S-(N-ethyl-N-phenylcarbamoylmethyl)-dithiophosphoric acid;

O,O-diethyl-S-(N-methyl-N-phenylcarbamoylmethyl)-dithiophosphoric acid;

Table

| kg/ha | I 0.5 | 1 | 2 | II 1 | 1.5 | 3 | III 1.5 | 2 | 3 | IV 0.5 | 1 | 1.5 | 2 |
|---|---|---|---|---|---|---|---|---|---|---|---|---|---|
| Beta vulgaris | 0 | 0 | 20 | 0 | 5 | 30 | 0 | 0 | 15 | 0 | 0 | 15 | 20 |
| Oryza sativa | 0 | 0 | 20 | 0 | 5 | 25 | 0 | 10 | 20 | 0 | 0 | 20 | 30 |
| Echinochloa crus-galli | 65 | 80 | 100 | 90 | 95 | 100 | 70 | 80 | 95 | 10 | 20 | 30 | 40 |
| Avena fatua | 70 | 100 | 100 | 85 | 100 | 100 | 40 | 55 | 80 | 10 | 20 | 25 | 30 |
| Galinsoga parviflora | 10 | 20 | 35 | 15 | 20 | 40 | 70 | 55 | 100 | 80 | 90 | 100 | 100 |
| Chenopodium album | 10 | 20 | 35 | 15 | 25 | 45 | 80 | 100 | 100 | 85 | 95 | 100 | 100 |

| kg/ha | I + III 0.5 + 1.5 | I + IV 1 + 1 | II + III 1 + 2 | II + IV 1 + 0.5 |
|---|---|---|---|---|
| Beta vulgaris | 0 | 0 | 0 | 0 |
| Oryza sativa | 0 | 0 | 10 | 0 |
| Echinochloa crus-galli | 100 | 100 | 100 | 100 |
| Avena fatua | 100 | 100 | 100 | 95 |
| Galinsoga parviflora | 90 | 100 | 100 | 95 |
| Chenopodium album | 100 | 100 | 100 | 100 |

0 = no damage
100 = complete destruction

The action of the following mixtures corresponds to that of the mixtures in Examples 4 and 5:

O,O-diethyl-S-(N-butyn-1-yl-(3)-N-phenylcarbamoylmethyl)-dithiophosphoric acid;

O,O-diethyl-S-(N-pentyn-1-yl-(3)-N-phenylcarbamoylmethyl)-dithiophosphoric acid;

O,O-di-(isopropyl)-S-(N-butyn-(1)-yl-(3)-N-phenylcarbamoylmethyl)-dithiophosphoric acid;

0,0-diethyl-S-(N-β-chloropropyl-N-phenylcarbamoylmethyl)-dithiophosphoric acid;
0,0-dimethyl-S-(N-isopropyl-N-cyclohexylcarbamoylmethyl)-dithiophosphoric acid;
O-ethylethyl-S-(N-isopropyl-N-cyclohexylcarbamoylmethyl)-dithiophosphoric acid;
O-ethylphenyl-S-(N-isopropyl-N-cyclohexylcarbamoylmethyl)-dithiophosphoric acid;
0,0-dimethyl-S-(N-butyn-(1)-yl-(3)-N-cyclohexylcarbamoylmethyl)-dithiophosphoric acid;
0,0-diethyl-S-(N-butyn-(1)-yl-(3)-N-cyclohexylcarbamoylmethyl)-dithiophosphoric acid;
0,0-diethyl-S-(N-butyn-(1)-yl-(3)-N-cyclohexylcarbamoylmethyl)-thiophosphoric acid;
0,0-di-(isopropyl)-S-(N-isopropyl-N-cyclohexylcarbamoylmethyl)-thiophosphoric acid;
0,0-dimethyl-S-(N-α-cyanoethyl-N-phenylcarbamoylmethyl)-dithiophosphoric acid;
0,0-diethyl-S-(N-β-cyanoethyl-N-phenylcarbamoylmethyl)-dithiophosphoric acid;
0,0-diethyl-S-(N-β-cyanoethyl-N-cyclohexylcarbamoylmethyl)-dithiophosphoric acid;
0,0-diethyl-S-(N-isopropyl-N-cyclohexylcarbamoylmethyl)-dithiophosphoric acid;
0,0-diethyl-S-(N-butyn-1-yl-(3)-N-phenylcarbamoylmethyl)-thiophosphoric acid;
0,0-dimethyl-S-(N-butyn-1-yl-(3)-N-phenylcarbamoylmethyl)-thiophosphoric acid;
0,0-diethyl-S-(N-β-cyanoethyl-N-phenylcarbamoylmethyl)-thiophosphoric acid;
0,0-diethyl-S-(N-α-cyanoethyl-N-phenylcarbamoylmethyl)-thiophosphoric acid;
0,0-diethyl-S-(N-pentyn-1-yl-(3)-N-phenylcarbamoylmethyl)-thiophosphoric acid;
0,0-diethyl-S-(N-β-cyanoethyl-N-cyclohexylcarbamoylmethyl)-thiophosphoric acid; or
0,0-diethyl-S-(N-isopropyl-N-cyclohexylcarbamoylmethyl)-thiophosphoric acid;
with
1-m-trifluoromethylphenyl-4-dimethylamino-5-chloropyridazone-6;
1-m-trifluoromethylphenyl-4-diethylamino-5-chloropyridazone-6;
1-m-trifluoromethylphenyl-4-methoxy-5-chloropyridazone-6;
1-m-trifluoromethylphenyl-4-methoxy-5-bromopyridazone-6;
1-m-trifluoromethylphenyl-4,5-dimethoxypyridazone-6;
1-m-trifluoromethylphenyl-4-amino-5-bromopyridazone-6;
1-m-trifluoromethylphenyl-4-α-hydroxy-β,β,β-trichloroethylamino-5-chloropyridazone-6;
1-m-trifluoromethylphenyl-4-acetylamino-5-bromopyridazone-6;
1-phenyl-4-methoxy-5-chloropyridazone-6;
1-phenyl-4-methoxy-5-bromopyridazone-6;
1-phenyl-4,5-dimethoxypyridazone-6;
1-m-methylphenyl-4-amino-5-bromopyridazone-6;
1-m-methylphenyl-4-methoxy-5-bromopyridazone-6;
1-m-methylphenyl-4,5-dimethoxypyridazone-6;
1-m-trifluoromethylphenyl-4-dimethylamino-5-bromopyridazone-(6);
1-phenyl-4-dichloroacetylamino-5-bromopyridazone-(6);
1-phenyl-4-bromoacetylamino-5-bromopyridazone-(6);
N-[1-m-methylphenyl-5-chloropyridazon (6)-yl-(4)]-oxamic acid, tert-butyl ester;
N-[1-phenyl-5-bromopyridazon-(6)-yl-(4)]-oxamic acid, propargyl ester;
N-[1-phenyl-5-bromopyridazon-(6)-yl-(4)]-oxamic acid, isopropyl ester;
N-[1-phenyl-5-bromopyridazon-(6)-yl-(4)]-oxamic acid, isopropyl ester;
N-[1-phenyl-5-bromopyridazon-(6)-yl-(4)]-azelamic acid, ethyl ester;
N-[1-phenyl-5-bromopyridazon-(6)-yl-(4)]-suberamic acid, ethyl ester;
N-[1-phenyl-5-bromopyridazon-(6)-yl-(4)]-adipamic acid;
N-[1-phenyl-5-bromopyridazon-(6)-yl-(4)]-adipamic acid, isobutyl ester;
N-[1-phenyl-5-bromopyridazon-(6)-yl-(4)]-adipamic acid, β-trifluoroethyl ester;
N-[1-phenyl-5-bromo-pyridazon-(6)-yl-(4)]-malonamic acid, ethyl ester;
N-[1-phenyl-5-bromopyridazon-(6)-yl-(4)]-malonamic acid, methyl ester;
N-[1-cyclohexyl-5-chloropyridazon-(6)-yl-(4)]-malonamic acid, methyl ester;
N-[1-cyclohexyl-5-chloropyridazon-(6)-yl-(4)]-glutaramic acid, methyl ester;
N-(1-cyclohexyl-5-chloropyridazon-6-yl-4)-adipamic acid ester;
N-[1-cyclohexyl-5-bromopyridazon-(6)-yl-(4)]- oxamic acid, phenylthiol ester;
N-m-trifluoromethylphenyl-N-1-cyclohex-1-ethyl-N',N'-dimethylurea;
N-m-trifluoromethyl-N-cyclohex-1-enyl-N'-methylurea;
N-3-chlorophenyl-N-cyclohex-1-enyl-N'-methylurea;
N-3-chloro-4-methoxyphenyl-N-cyclohex-1-enyl-N'-methylurea;
N-4-chlorophenyl-N-cyclohex-1-enyl-N'-methylurea;
N-phenyl-N-cyclohex-1-enyl-N'-methylurea;
N-phenyl-N-cyclohex-1-enyl-N',N'-dimethylurea;
N-4-bromophenyl-N-cyclohex-1-enyl-N',N'-dimethylurea;
N-3,4-dichlorophenyl-N-cyclohex-1-enyl-N',N'-dimethylurea;
N-3-chloro-4-methoxyphenyl-N-cyclohex-1-enyl-N',N'-dimethylurea;
N-[1- or 2-(3a,4,5,6,7,7a-hexahydro-4)-methanoindanyl]-N',N'-dimethyl-N-cyclohex-1-enylurea;
N-m-trifluoromethylphenyl-N-cyclooct-1-enyl-N',N'-dimethylurea;
N-m-trifluoromethylphenyl-N-cyclooctyl-1-enyl-N-methylurea;
N-[5-(3a,4,5,6,7,7a-hexahydro-4)-methanoindanyl]-N',N'-dimethylurea;
N-[1- or 2-(3a,4,5,6,7,7a-hexahydro-4)-methanoindanyl]-N',N'-dimethylurea;
N-bicyclo-(3,3,0)-octyl-N',N'-dimethylurea;

N-3,4-dichlorophenyl-N', N'-dimethylurea;
N-cyclooctyl-N',N'-dimethylurea;
N-m-dimethylcarbamoyloxyphenyl-N-methylurea;
N-m-chlorophenyl-N-1-cyclohex-1-enyl-N',N'-dimethylurea;
N-p-fluorophenyl-N-1-cyclohex-1-enyl-N'-methylurea;
N-4-[4-methoxyphenoxyphenyl]-N'N'-dimethylurea;
N-3,4-dichlorophenyl-N-methyl-N'-methoxyurea;
N-(3-chloro-4-bromophenyl)-N'-methyl-N'-methoxyurea;
N,N-dimethyl-3-[3-(N-methoxyisopropylcarbamoyloxy)-phenyl]-urea;
N,N-dimethyl-N'-[3-N(-methylbutyn-(1)-yl-(3)-carbamoyloxy)-phenyl]-urea;
1-(m-tert-butylcarbamoyloxyphenyl)-3-methylurea;
1-(m-ethylcarbamoyloxyphenyl)-3-methylurea;
1-(m-allyl-tert-butylcarbamoyloxyphenyl)-3,3-dimethylurea;
1-(m-$\alpha,\alpha$-dimethylpropyn-(1)-yl-(3)-carbamoyloxyphenyl)-3-methyl-3-methoxyurea;
1-(m-$\alpha$-methyl-$\alpha$-ethylpropyn-(1)-yl-(3)-carbamoyloxyphenyl)-3-methyl-3-methoxyurea;
1-(m-tert-butylallylcarbamoyloxyphenyl)-3-methyl-3-methoxyurea;
N-m-trifluoromethylphenyl-N'-methyl-N'-butyl-(1)-yl-(3)-urea;
N-3-chloro-4-methoxyphenyl-N'-methyl-N'-methoxyurea;
N-m-trifluoromethylphenyl-N-methoxymethyl-N'-methylurea;
N-m-trifluoromethylphenyl-N-methoxymethyl-N'-methyl-N'-methoxyurea;
N-m-trifluoromethylphenyl-N-acetyloxymethyl-N',N'-dimethylurea;
2-chloro-4-ethylamino-6-butyl-1-yl-3-amino-1,3,5-triazine;
2-chloro-4-ethylamino-6-methoxyisopropyl-1,3,5-triazine;
2-chloro-4-ethylamino-6-$\alpha,\alpha$-dimethylpropargylamino-1,3,5-triazine;
2-chloro-4-isopropylamino-6-$\alpha,\alpha$-dimethylpropargylamino-1,3,5-triazine;
2-thiomethyl-4-ethylamino-6-butyn-1-yl-3-amino-1,3,5-triazine;
2-chloro-4-ethylamino-6-sec-butylamino-1,3,5-triazine;
2-chloro-4-ethylamino-6-$\alpha,\alpha$-dimethylcyanomethylamino-1,3,5-triazine;
2-chloro-4-isopropylamino-6-diethylamino-1,3,5-triazine;
2-methoxy-4-isopropylamino-6-ethylamino-1,3,5-triazine;
2-thiomethyl-4-isopropylamino-6-tert-butylamino-1,3,5-triazine; or
2-azido-4-sec-butylamino-6-thiomethyl-1,3,5-triazine.

The action of the following mixtures corresponds to that of the mixtures in Example 6 and 7:

O,O-diethyl-S-(N-butyn-1-yl-(3)-N-phenylcarbamoylmethyl)-dithiophosphoric acid;
O,O-dimethyl-S-(N-butyn-1-yl-(3)-N-phenylcarbamoylmethyl)-dithiophosphoric acid;
methyl-O-methyl-S-(N-butyn-1-yl-(3)-N-phenylcarbamoylmethyl)-dithiophosphoric acid;
ethyl-O-ethyl-S-(N-butyl-1-yl-(3)-N-phenylcarbamoylmethyl)-dithiophosphoric acid;
O,O-diallyl-S-(N-butyl-1-yl-(3)-N-phenylcarbamoylmethyl)-dithiophosphoric acid;
ethyl-O-methyl-S-(N-butyl-1-yl-(3)-N-phenylcarbamoylmethyl)-dithiophosphoric acid;
phenyl-O-ethyl-S-(N-butyl-1-yl-(3)-N-phenylcarbamoylmethyl)- dithiophosphoric acid;
O,O-diphenyl-S-(N-butyn-1-yl-(3)-N-phenylcarbamoylmethyl)-dithiophosphoric acid;
O,O-diethyl-S-(3,5-dimethylmorpholine-N-carbamoylmethyl)-dithiophosphoric acid;
O,O-diethyl-S-(2,5-dimethylmorpholine-N-carbamoylmethyl)-dithiophosphoric acid;
O,O-diethyl-S-(N-ethyl-N-3'-methylphenylcarbamoylmethyl)-dithiophosphoric acid;
O,O-diethyl-S-(N-isopropyl-N-3'-phenylcarbamoylmethyl)-dithiophosphoric acid;
O,O-di-(isopropyl)-S-(N-butyl-(1)-yl-(3)-N-phenylcarbamoylmethyl)-dithiophosphoric acid;
O,O-diethyl-S-(N-$\beta$-chloropropyl-N-phenylcarbamoylmethyl)-dithiophosphoric acid;
O,O-dimethyl-S-(N-isopropyl-N-cyclohexylcarbamoylmethyl)-dithiophosphoric acid;
O-ethylethyl-S-(N-isopropyl-N-cyclohexylcarbamoylmethyl)-dithiophosphoric acid;
O-ethylphenyl-S-(N-isopropyl-N-cyclohexylcarbamoylmethyl)-dithiophosphoric acid;
O,O-dimethyl-S-(N-butyl-(1)-yl-(3)-N-cyclohexylcarbamoylmethyl)-dithiophosphoric acid;
O,O-diethyl-S-(N-butyn-(1)-yl-(3)-N-cyclohexylcarbamoylmethyl)-dithiophosphoric acid;
O,O-diethyl-S-(N-butyn-(1)-yl-(3)-N-cyclohexylcarbamoylmethyl)-thiophosphoric acid;
O,O-di-(isopropyl)-S-(N-isopropyl-N-cyclohexylcarbamoylmethyl)-thiophosphoric acid;
O,O-diethyl-S-(N-propargyl-N-phenylcarbamoylmethyl)-dithiophosphoric acid;
O,O-diethyl-S-(N-bromobutyn-1-yl-(3)-N-phenylcarbamoylmethyl)-dithiophosphoric acid;
O,O-diethyl-S-(N-cyanomethyl-N-phenylcarbamoylmethyl)-dithiophosphoric acid;
O,O-diethyl-S-(N-ethyl-N-phenylcarbamoylmethyl)-dithiophosphoric acid;
O,O-diethyl-S-(N-methyl-N-phenylcarbamoylmethyl)-dithiophosphoric acid;
O,O-diethyl-S-(N-pentyn-1-yl-(3)-N-phenylcarbamoylmethyl)-dithiophosphoric acid;
O,O-dimethyl-S-(N-$\alpha$-cyanoethyl-N-phenylcarbamoylmethyl)-dithiophosphoric acid;
O,O-diethyl-S-(N-$\beta$-cyanoethyl-N-phenylcarbamoylmethyl)-dithiophosphoric acid;
O,O-diethyl-S-(N-$\beta$-cyanoethyl-N-cyclohexylcarbamoylmethyl)-dithiophosphoric acid;
O,O-diethyl-S-(N-isopropyl-N-cyclohexylcarbamoylmethyl)-dithiophosphoric acid;
O,O-diethyl-S-(N-butyn-1-yl-(3)-phenylcarbamoylmethyl)-thiophosphoric acid;
O,O-dimethyl-S-(N-butyn-1-yl-(3)-N-phenylcarbamoylmethyl)-thiophosphoric acid;
O,O-diethyl-S-(N-$\beta$-cyanoethyl-N-phenylcarbamoylmethyl)-thiophosphoric acid;

O,O-diethyl-S-(N-α-cyanoethyl-N-phenylcarbamoylmethyl)-thiophosphoric acid;
O-O-diethyl-S-(N-pentyn-1-yl-(3)-N-phenylcarbamoylmethyl)-thiophosphoric acid;
O,O-diethyl-S-(N-β-cyanoethyl-N-cyclohexylcarbamoylmethyl)-thiophosphoric acid; or
O,O-diethyl-S-(N-isopropyl-N-cyclohexylcarbamoylmethyl)-thiophosphoric acid;

with

N-(1-phenyl-5-bromopyridazon-6-yl-4)-adipamic acid ester;
N-(1-phenyl-5-chloropyridazon-6-yl-4)-(3'-acetylaminophenyl)-carbamate;
1-m-trifluoromethylphenyl-4-dimethylamino-5-bromopyridazone-(6);
1-phenyl-4-dichloroacetylamino-5-bromopyridazone-(6);
1-phenyl-4-bromoacetylamino-5-bromopyridazone-(6);
N-[1-m-methylphenyl-5-chloropyridazon-(6)-yl-(4)]-oxamic acid, tert-butyl ester;
N-[1-phenyl-5-bromopyridazon-(6)-yl-(4)]-oxamic acid, propargyl ester;
N-[1-phenyl-5-bromopyridazon-(6)-yl-(4)]-oxamic acid, isopropyl ester;
N-[1-phenyl-5-bromopyridazon-(6)-yl-(4)]-azelamic acid, ethyl ester;
N-[1-phenyl-5-bromopyridazon-(6)-yl-(4)]-subermaic acid, ethyl ester;
N[1-phenyl-5-bromopyridazon-(6)-yl-(4)]-adipamic acid;
N-[1-phenyl-5-bromopyridazon-(6)-yl-(4)]-adipamic acid, isobutyl ester;
N-[1-phenyl-5-bromopyridazon-(6)-yl-(4)]-adipamic acid, β-trifluoroethyl ester;
N-[1-phenyl-5-bromopyridazon-(6)-yl-(4)]-malonamic acid, ethyl ester;
N-[1-phenyl-5-bromopyridazon-(6)-yl-(4)]-malonamic acid, methyl ester;
N-[1-cyclohexyl-5-chloropyridazon-(6)-yl-(4)]-malonamic acid, methyl ester;
N-[1-cyclohexyl-5-chloropyridazon-(6)-yl-(4)]-glutaramic acid, methyl ester;
1-phenyl-4-amino-5-bromopyridazonyl-N-acetoacetate;
N-[1-phenyl-5-bromopyridazon-(6)-yl-(4)]-oxamic acid, tert-butyl ester;
N-(1-phenyl-5-bromopyridazon-6-yl-4)-oxamic acid, β-methoxyethyl ester;
N-[4-(1-phenyl-5-bromopyridazon )-yl]-aminotartronic acid, diethyl ester;
3-[N-(4-(1-phenyl-5-bromopyridazon-6-yl)-carbamoyloxyphenyl)]-methyl carbamate;
N-[1-phenyl-5-bromopyridazon-6-yl-4]-(3'-acetylaminophenyl)-carbamate;
N-[1-phenyl-5-bromopyridazon-6-yl-(4)]-oxamic acid, sodium salt;
N-(1-phenyl-5-bromopyridazon-6-yl-4)-oxamic acid, methyl ester;
N-(1-cyclohexyl-5-chloropyridazon-6-yl-4)-adipamic acid ester;
4-chlorophenylcarbamic acid-m-acetoacetate aminophenyl ester;
3-trifluoromethylphenylcarbamic acid-m-acetoacetate aminophenyl ester;
4-fluorophenylcarbamic acid-m-acetoacetate aminophenyl ester;
3-chloro-4-bromophenylcarbamic acid-m-acetoacetate aminophenyl ester;
3-[(1'-methylmercaptomethyl)-propylcarbamoyloxyphenyl]-methyl carbamate;
3-[(1'-ethylmercaptomethyl)-propylcarbamoyloxyphenyl]-methyl carbamate;
N-1,2-dimethylhexylcarbamic acid-(m-carbomethoxyaminophenyl)-ester;
N-1,1-dimethylallylcarbamic acid-(m-carbomethoxyaminophenyl)-ester;
N-1,1-dimethylisobutylcarbamic acid-(m-carbomethoxyaminophenyl)-ester;
N-1,5-dimethylpentylcarbamic acid-(m-carbomethoxyaminophenyl)-ester;
N-1-methylcyclopentylcarbamic acid-(m-carbomethoxyaminophenyl)-ester;
phenylcarbamic acid-m-acetoacetate aminophenyl ester;
3-methylphenylcarbamic acid-m-acetoacetate aminophenyl ester;
N-β-ethylmercaptoethylcarbamic acid-(m-carbomethoxyaminophenyl)-ester;
N-β-methylmercaptoethylcarbamic acid-(-m-carbomethoxyaminophenyl)-ester;
1-m-methylphenyl-4-amino-5-bromopyridazone-6;
N-(β-ethylmercaptoisopropyl)-carbamic acid-(m-carbomethoxyaminophenyl)-ester;
N-(β-methylmercaptoisopropyl)-carbamic acid-(m-carbomethoxyamino-phenyl)-ester;
methyl-m-(tricyclo-(3,2,1,0)-decenylcarbamoyl)-oxyphenyl carbamate;
methyl-N-[3-(3',4'-dichlorophenylcarbamoyloxy)-4-methylphenyl]-carbamate;
N-(p-fluorophenyl)-carbamic acid-(m-carbomethoxyamino-p-methyl-phenyl)-ester; or
N-(m-trifluoromethylphenyl)-carbamic acid-(m-carbomethoxyamino-p-methylphenyl)-ester.

EXAMPLE 10

An agricultural plot was sown with Gossypium hirsutum, Setaria faberii, Amaranthus retroflexus, Portulaca oleracea, and Cyperus esculentus and subsequently treated with the following amounts of the following individual active ingredients and mixtures of them, each active ingredient and each mixture being emulsified or dispersed in 500 liters of water per hectare:

I     N-allyl-N-β-chloroethyl-2,6-dinitro-4-trifluoromethylaniline, 1.5 and 4 kg per hectare;
II     N-propyl-N-β-chloroethyl-2,6-dinitro-4-trifluoromethylaniline, 1 and 3 kg per hectare;
III     N-β-methoxyethyl-N-β-chloroethyl-2,6-dinitro-4-trifluoromethylaniline, 2 and 4 per hectare;
IV     N-β-methoxyethyl-N-β-azidoethyl-2,6-dinitro-4-trifluoromethylaniline, 3 and 4 kg per hectare;
V     N,N-bis-propyl-2,6-dinitro-4-trifluoromethylaniline, 1 and 4 kg per hectare;
VI     1-m-trifluoromethylphenyl-4-methoxy-5-chloropyridazone-6, 2 and 3 kg per hectare;
VII     1-m-trifluoromethylphenyl-4-methoxy-5-bromopyridazone-6, 2 and 4 kg per hectare;
VIII     1-m-trifluoromethylphenyl-4,5-dimethoxypyridazone-6, 1 and 4 kg per hectare;
IX     1-m-trifluoromethylphenyl-4-diethylamino-5-chloropyridazone-6, 3 and 4 kg per hectare;

X   1-m-trifluoromethylphenyl-4-dimethylamino-5-chloropyridazone-6, 2.5 and 4 kg per hectare;
I + X : 1.5 + 2.5 kg per hectare;
II + VI : 1 + 2 kg per hectare;
III + VII : 2 + 2 kg per hectare;
IV + VIII : 3 + 1 kg per hectare;
V + IX : 1 + 3 kg per hectare.

After 4 to 5 weeks it was ascertained that the mixtures had a stronger herbicidal action than the individual active ingredients, combined with superior crop plant compatibility.

The results of the experiment are given in the following table:

trifluoromethylaniline, 2 and 3 kg per hectare;
IV   dimethylaminoethanol salt of N-[1-phenyl-5-bromopyridazon-6-yl-(4)]-oxamic acid, 1.5 and 3 kg per hectare;
V   1-phenyl-4-amino-5-chloropyridazone-6, 3 and 4 kg per hectare;
VI   3-methoxycarbonylaminophenyl-N-(3'-methylphenyl)-carbamate, 1 and 2 kg per hectare;
I + IV : 1.5 + 1,5 kg per hectare;
II + V : 1 + 3 kg per hectare;
III + VI : 2 + 1 kg per hectare.

After 2 to 3 weeks it was ascertained that the mix-

TABLE

|  | I | | II | | III | | IV | | V | | VI | | VII | | VIII | | IX | | X | |
|---|---|---|---|---|---|---|---|---|---|---|---|---|---|---|---|---|---|---|---|---|
| Kg./ha | 1.5 | 4 | 1 | 3 | 2 | 4 | 3 | 4 | 1 | 4 | 2 | 3 | 2 | 4 | 1 | 4 | 3 | 4 | 2.5 | 4 |
| Gossypium hirsutum | 0 | 20 | 0 | 25 | 0 | 25 | 0 | 0 | 0 | 25 | 0 | 15 | 0 | 25 | 0 | 45 | 0 | 5 | 0 | 25 |
| Setaria faberii | 55 | 100 | 50 | 100 | 65 | 100 | 55 | 100 | 65 | 100 | 45 | 75 | 35 | 80 | 45 | 100 | 30 | 45 | 35 | 75 |
| Amaranthus retroflexus | 25 | 75 | 25 | 75 | 15 | 40 | 20 | 30 | 15 | 60 | 55 | 80 | 75 | 85 | 65 | 100 | 60 | 80 | 50 | 90 |
| Portulaca oleracea | 30 | 80 | 25 | 70 | 30 | 55 | 25 | 35 | 20 | 65 | 60 | 90 | 45 | 85 | 65 | 100 | 65 | 90 | 55 | 95 |
| Cyperus esculentus | 15 | 60 | 20 | 65 | 20 | 45 | 20 | 30 | 20 | 75 | 50 | 80 | 40 | 75 | 55 | 100 | 40 | 65 | 45 | 80 |

|  | I+X | II+VI | III+VII | IV+VIII | V+IX |
|---|---|---|---|---|---|
| Kg./ha | 1.5+2.5 | 1+2 | 2+2 | 3+1 | 1+3 |
| Gossypium hirsutum | 0 | 0 | 0 | 0 | 0 |
| Setaria faberii | 100 | 100 | 100 | 100 | 100 |
| Amaranthus retroflexus | 100 | 100 | 85 | 95 | 100 |
| Portulaca oleracea | 100 | 100 | 95 | 100 | 100 |
| Cyperus esculentus | 80 | 100 | 80 | 90 | 80 |

NOTE.—0 = no damage; 100 = complete destruction.

EXAMPLE 11

The following amounts of the following individual active ingredients and mixtures of them were each emulsified or dispersed in 500 liters of water per hectare and sprayed onto plants (growth height: 7 to 12 cm) of Beta vulgaris, Setaria faberii, Bromus tectorum, Galinsoga parviflora and Sinapis arvensis:

I   N-allyl-N-β-chloroethyl-2,6-dinitro-4-trifluoromethylaniline, 1.5 and 3 kg per hectare;
II   N-propyl-N-β-chloroethyl-2,6-dinitro-4-trifluoromethylaniline, 1 and 4 kg per hectare;
III   N-β-methoxyethyl-N-β-chloroethyl-2,6-dinitro-4- tures had a far stronger herbicidal action than the individual active ingredients, combined with superior compatibility with Beta vulgaris.

The results of the experiment are given in the following table:

Table

| kg/ha | I | | II | | III | | IV | | V | | VI | | I+IV | II+V | III+VI |
|---|---|---|---|---|---|---|---|---|---|---|---|---|---|---|---|
|  | 1.5 | 3 | 1 | 4 | 2 | 3 | 1.5 | 3 | 3 | 4 | 1 | 2 | 1.5+1.5 | 1+3 | 2+1 |
| Beta vulgaris | 0 | 35 | 0 | 35 | 0 | 5 | 0 | 15 | 0 | 10 | 0 | 20 | 0 | 0 | 0 |
| Setaria faberii | 45 | 85 | 50 | 90 | 40 | 80 | 35 | 70 | 30 | 60 | 20 | 40 | 100 | 100 | 90 |
| Bromus tectorum | 40 | 80 | 45 | 90 | 40 | 80 | 35 | 70 | 35 | 70 | 15 | 30 | 100 | 100 | 85 |
| Galinsoga parviflora | 10 | 30 | 10 | 25 | 10 | 20 | 35 | 90 | 45 | 80 | 50 | 100 | 85 | 85 | 85 |
| Sinapis arvensis | 15 | 35 | 15 | 35 | 10 | 30 | 55 | 90 | 45 | 95 | 65 | 100 | 90 | 90 | 100 |

0 = no damage
100 = complete destruction

I claim:
1. A process for controlling the growth of unwanted plants which comprises applying a phytotoxic amount of a mixture of (a) N-propyl-N- -chloroethyl-2,6-dinitro-4-trifluoromethylaniline and (b) 1-phenyl-4-amino-5-chloropyridazone-(6), the weight ratio of a:b being in the range of 1:3 to 3:1.

* * * * *

UNITED STATES PATENT OFFICE
CERTIFICATE OF CORRECTION

PATENT NO. : 3,849,107
DATED : November 19, 1974
INVENTOR(S) : Adolf Fischer

It is certified that error appears in the above-identified patent and that said Letters Patent are hereby corrected as shown below:

In Column 9, Line 34, delete "methyl" and substitute --ethyl--

In Column 10, Line 51, delete "III + 3VI:" and substitute --III + VI:--

In Column 10, Line 55, delete "I+X" and substitute --II + X--

In Column 20, Line 39, delete "ethyl" and substitute --enyl--

In Column 21, Line 37, delete "butyl" and substitute --butyn--

In Column 22, Line 1, delete "butyl" and substitute --butyn--

In Column 22, Line 18, delete "butyl" and substitute --butyn--

In Column 22, Line 31, delete "butyl" and substitute --butyn--

In Column 26, Line 9, delete "1,5" and substitute --1.5--

Signed and Sealed this

Third Day of August 1976

[SEAL]

Attest:

RUTH C. MASON
Attesting Officer

C. MARSHALL DANN
Commissioner of Patents and Trademarks